(12) United States Patent
Burnett

(10) Patent No.: US 11,007,440 B2
(45) Date of Patent: *May 18, 2021

(54) COMPUTER ARCHITECTURE FOR SIMULATION OF SPORTING EVENTS BASED ON REAL-WORLD DATA

(71) Applicant: Electronic Arts Inc., Redwood City, CA (US)

(72) Inventor: Christopher George Burnett, Longwood, FL (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,499

(22) Filed: Oct. 14, 2019

(65) Prior Publication Data

US 2020/0038757 A1 Feb. 6, 2020

Related U.S. Application Data

(63) Continuation of application No. 15/247,704, filed on Aug. 25, 2016, now Pat. No. 10,478,730.

(51) Int. Cl.
*A63F 13/65* (2014.01)
*A63F 13/25* (2014.01)
(Continued)

(52) U.S. Cl.
CPC ............. *A63F 13/65* (2014.09); *A63F 13/20* (2014.09); *A63F 13/25* (2014.09); *A63F 13/32* (2014.09);
(Continued)

(58) Field of Classification Search
CPC .......... A63F 13/65; A63F 13/20; A63F 13/25; A63F 13/32; A63F 13/33; A63F 13/335;
(Continued)

(56) References Cited

U.S. PATENT DOCUMENTS 8,083,577 B2 12/2011 Harris
8,829,185 B2 9/2014 Dixon et al.
(Continued)

OTHER PUBLICATIONS

Lu, et al., "Identifying Players in Broadcast Sports Videos", published in Computer Vision and Pattern Recognition (CVPR), 2011 IEEE Conference, University of British Columbia.

*Primary Examiner* — Werner G Garner
(74) *Attorney, Agent, or Firm* — McDermott Will & Emery LLP

(57) ABSTRACT

Methods for improving simulation of a sporting event by using real-world data are provided. In one aspect, a method includes positioning a simulated player corresponding to a player on a simulated field based on player positional data. The method also includes positioning a simulated ball corresponding to a physical ball on the simulated field based on ball positional data. The method also includes modifying the simulation based on user input by deviating the simulated player from the player positional data of the player on the physical field of the sporting event based on the user input when the user input moves the simulated player outside of a visual ring. The method also includes deviating a second player from a corresponding second player positional data when the second player is within a deviation ring, a radius of the visual ring different from a radius of the deviation ring.

20 Claims, 10 Drawing Sheets

(51) Int. Cl.
  *A63F 13/20* (2014.01)
  *A63F 13/812* (2014.01)
  *A63F 13/35* (2014.01)
  *A63F 13/32* (2014.01)
  *A63F 13/33* (2014.01)
  *A63F 13/335* (2014.01)

(52) U.S. Cl.
  CPC .......... *A63F 13/33* (2014.09); *A63F 13/335* (2014.09); *A63F 13/35* (2014.09); *A63F 13/812* (2014.09); *A63F 2300/69* (2013.01); *A63F 2300/8005* (2013.01); *A63F 2300/8011* (2013.01)

(58) Field of Classification Search
  CPC .... A63F 13/35; A63F 13/812; A63F 2300/69; A63F 2300/8005; A63F 2300/8011
  See application file for complete search history.

(56) References Cited

U.S. PATENT DOCUMENTS

| | | |
|---|---|---|
| 8,986,089 B1 | 3/2015 | Harris |
| 2009/0189982 A1 | 7/2009 | Tawiah |
| 2011/0119332 A1 | 5/2011 | Marshall |
| 2012/0233105 A1 | 9/2012 | Cavallaro |
| 2015/0201242 A1* | 7/2015 | Belton ............... H04N 21/4104 725/133 |
| 2017/0006322 A1 | 1/2017 | Dury |
| 2017/0169142 A1 | 6/2017 | Van der Velden |

* cited by examiner

COMPUTER ARCHITECTURE FOR SIMULATION OF SPORTING EVENTS BASED ON REAL-WORLD DATA

CROSS-REFERENCE TO RELATED APPLICATION

This present application claims the benefit of priority under 35 U.S.C. § 120 as a continuation of U.S. patent application Ser. No. 15/247,704, filed Aug. 25, 2016, now allowed, the disclosure of which is hereby incorporated by reference in its entirety for all purposes.

TECHNICAL FIELD

The present disclosure generally relates to computer architecture for simulation of real-world events, and more specifically relates to computer architecture for simulation of sporting events based on real-world data. The present disclosure describes improved resource utilization to produce accurate simulations of sporting events without requiring significant extra processing or hardware.

BACKGROUND

Video games, such as sports video games, provide ever increasing realistic game-playing experiences. Although a video game engine for a sports video game may recreate a virtual representation of a particular sport, such as football, users may seek to recreate a particular game that occurred in real life. Users may want to use replay controls as well as take over a player in the particular game.

The description provided in the background section should not be assumed to be prior art merely because it is mentioned in or associated with the background section. The background section may include information that describes one or more aspects of the subject technology.

SUMMARY

The disclosed system provides for simulating a sporting event using real-world data to position simulated players and a simulated ball on a simulated field, according to the positions of actual players and the actual ball from the sporting event. The simulation further allows a user to modify the simulation as the simulation runs.

According to certain aspects of the present disclosure, a computer-implemented method for improving simulation of a sporting event by using real-world data to seed the simulation is provided. The method includes positioning a simulated player corresponding to a player on a simulated field of the simulation based on player positional data, wherein the simulated field corresponds to a physical field. The method also includes positioning a simulated ball corresponding to a physical ball on the simulated field based on ball positional data. The method also includes modifying the simulation based on user input by deviating the simulated player from the player positional data of the player on the physical field of the sporting event based on the user input when the user input moves the simulated player outside of a visual ring. The method also includes deviating a second player from a corresponding second player positional data when the second player is within a deviation ring, a radius of the visual ring different from a radius of the deviation ring.

According to certain aspects of the present disclosure, a system for improving simulation of a sporting event by using real-world data to seed the simulation is provided. The system includes a memory comprising instructions, and a processor configured to execute the instructions. The processor is configured to execute the instructions to position a simulated player corresponding to a player on a simulated field of the simulation based on player positional data, wherein the simulated field corresponds to a physical field. The processor is also configured to execute the instructions to position a simulated ball corresponding to a physical ball on the simulated field based on ball positional data. The processor is also configured to execute the instructions to modify the simulation based on user input by deviating the simulated player from the player positional data of the player on the physical field of the sporting event based on the user input when the user input moves the simulated player outside of a visual ring. The processor is also configured to execute the instructions to deviate a second player from a corresponding second player positional data when the second player is within a deviation ring, a radius of the visual ring different from a radius of the deviation ring.

According to certain aspects of the present disclosure, a non-transitory machine-readable storage medium comprising machine-readable instructions for causing a processor to execute a method for improving simulation of a sporting event by using real-world data to seed the simulation is provided. The method includes positioning a simulated player corresponding to a player on a simulated field of the simulation based on player positional data, wherein the simulated field corresponds to a physical field. The method also includes positioning a simulated ball corresponding to a physical ball on the simulated field based on ball positional data. The method also includes modifying the simulation based on user input by deviating the simulated player from the player positional data of the player on the physical field of the sporting event based on the user input when the user input moves the simulated player outside of a visual ring. The method also includes deviating a second player from a corresponding second player positional data when the second player is within a deviation ring, a radius of the visual ring different from a radius of the deviation ring.

According to certain aspects of the present disclosure, a system for improving simulation of a sporting event by using real-world data to seed the simulation includes means for positioning a simulated player corresponding to a player on a simulated field of the simulation based on player positional data, wherein the simulated field corresponds to a physical field. The means are further configured for positioning a simulated ball corresponding to a physical ball on the simulated field based on ball positional data. The means are further configured for modifying the simulation based on user input by deviating the simulated player from the player positional data of the player on the physical field of the sporting event based on the user input when the user input moves the simulated player outside of a visual ring. The means are further configured for deviating a second player from a corresponding second player positional data when the second player is within a deviation ring, a radius of the visual ring different from a radius of the deviation ring.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
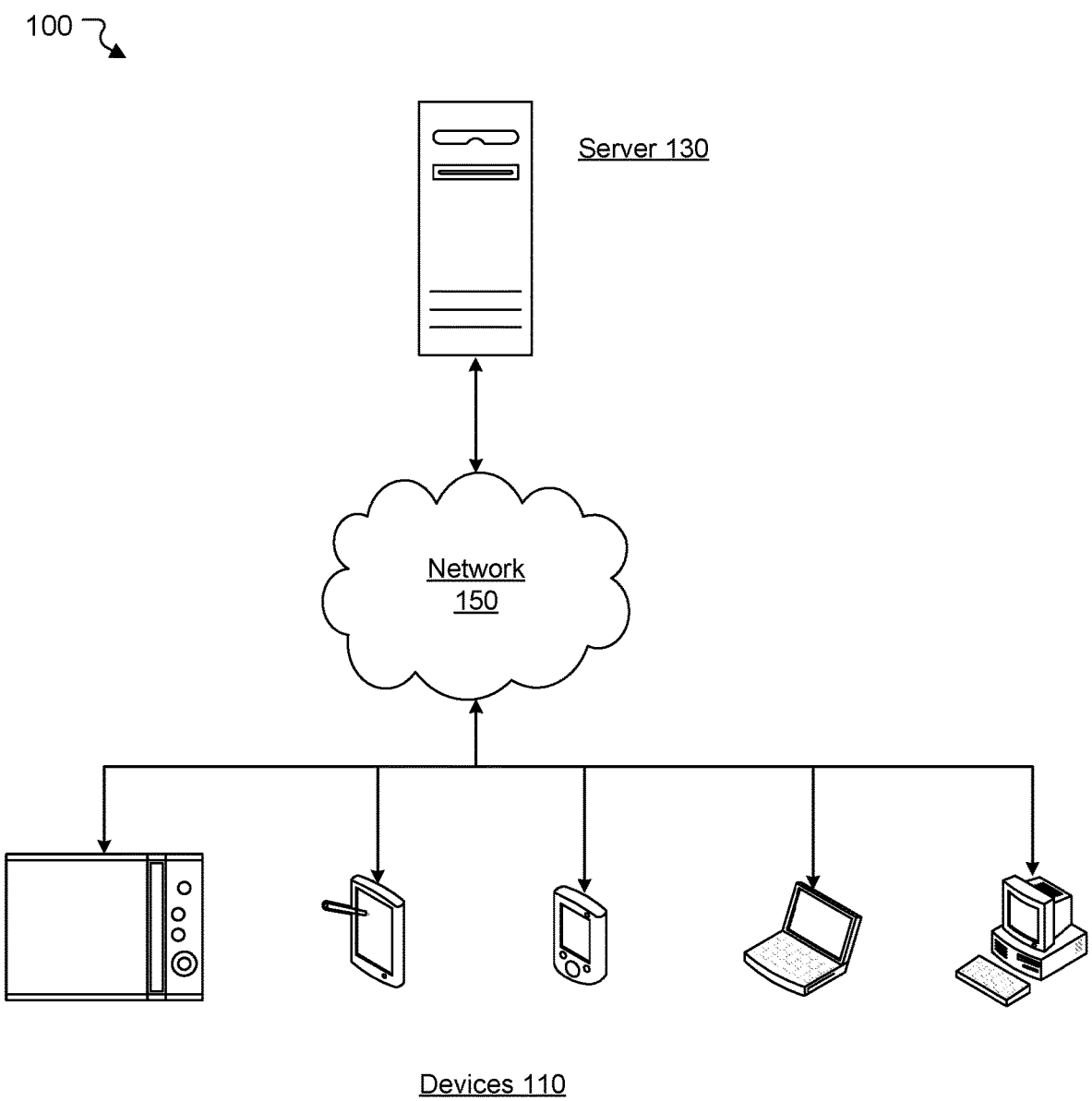
FIG. 1 illustrates an example architecture for improving simulation of a sporting event by using real-world data to seed the simulation.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for improving a simulation of a real-world sporting event by using real-world data derived from the real-world event. For example, by using real-world data derived from a sporting event, a simulation of the sporting event may accurately simulate the sporting event to recreate what occurred during the sporting event.

The disclosed system addresses a technical problem tied to computer technology and arising in the realm of computer networks, namely the technical problem of efficient and accurate simulation of a real-world sporting event. The disclosed system solves this technical problem by seeding the simulation with real-world data, and further providing parameters based on the real-world sporting event which, when conformed to, provides an accurate simulation requiring less processing than interpolating simulation behavior to reach a desired result corresponding to the real-world result. Computer simulation of a real-world event may be made more accurate through additional processing. However, the additional processing may require additional resources, such as additional time to complete the processing, or hardware capable of such processing without requiring the additional time, which may affect a user's access to the simulation and usability of the simulation. The disclosed system uses the real-world data to improve the simulation results, produces repeatable simulations which remain consistent with the real-world event being simulated, and requires less processing than determining specific conditions which will lead a simulation to the desired results.

While many examples are provided herein in the context of a video game or sports simulation, the principles of the present disclosure contemplate other types of simulations as well. For example, military simulations, medical simulations, choreography simulations, motion picture simulations, and other simulations involving moving pieces or people in a real-world location are all considered within the scope of the present disclosure.

Example System Architecture

FIG. 1 illustrates an example architecture 100 for improving simulation of a sporting event by using real-world data to seed the simulation. The architecture 100 includes one or more servers 130 and devices 110 connected over a network 150.

One of the many servers 130 is configured to host real-world data, such as real-world data corresponding to a sporting event. For purposes of load balancing, multiple servers 130 can host the real-world data. The server 130 may further be configured to host simulations for multiple devices 110. For example, the server 130 may host a multiplayer simulation for multiple devices 110 to connect to, such that the multiple devices 110 experience the same simulation at approximately the same time.

The devices 110 include one or more computing devices. The devices 110 may include devices capable of running a simulation engine, such as a sports game, for simulating sporting events. For example, the devices 110 may include stationary video game consoles, tablets, mobile devices, laptop computers, desktop computers, and/or other devices capable of running a sports game.

The disclosed system uses real-world data from a sporting event to seed a simulation of the sporting event. The server 130 sends the real-world data to one or more devices 110, which uses the real-world data in generating and running the simulation. As such, the disclosed system can, for example, create a fairly accurate simulation of the sporting event without requiring a complete digitizing of the sporting event, or an extensive reconfiguration of a simulation engine.

The servers 130 can be any device having an appropriate processor, memory, and communications capability for hosting real-world data. The devices 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Simulation of a Sporting Event

Figure 2:
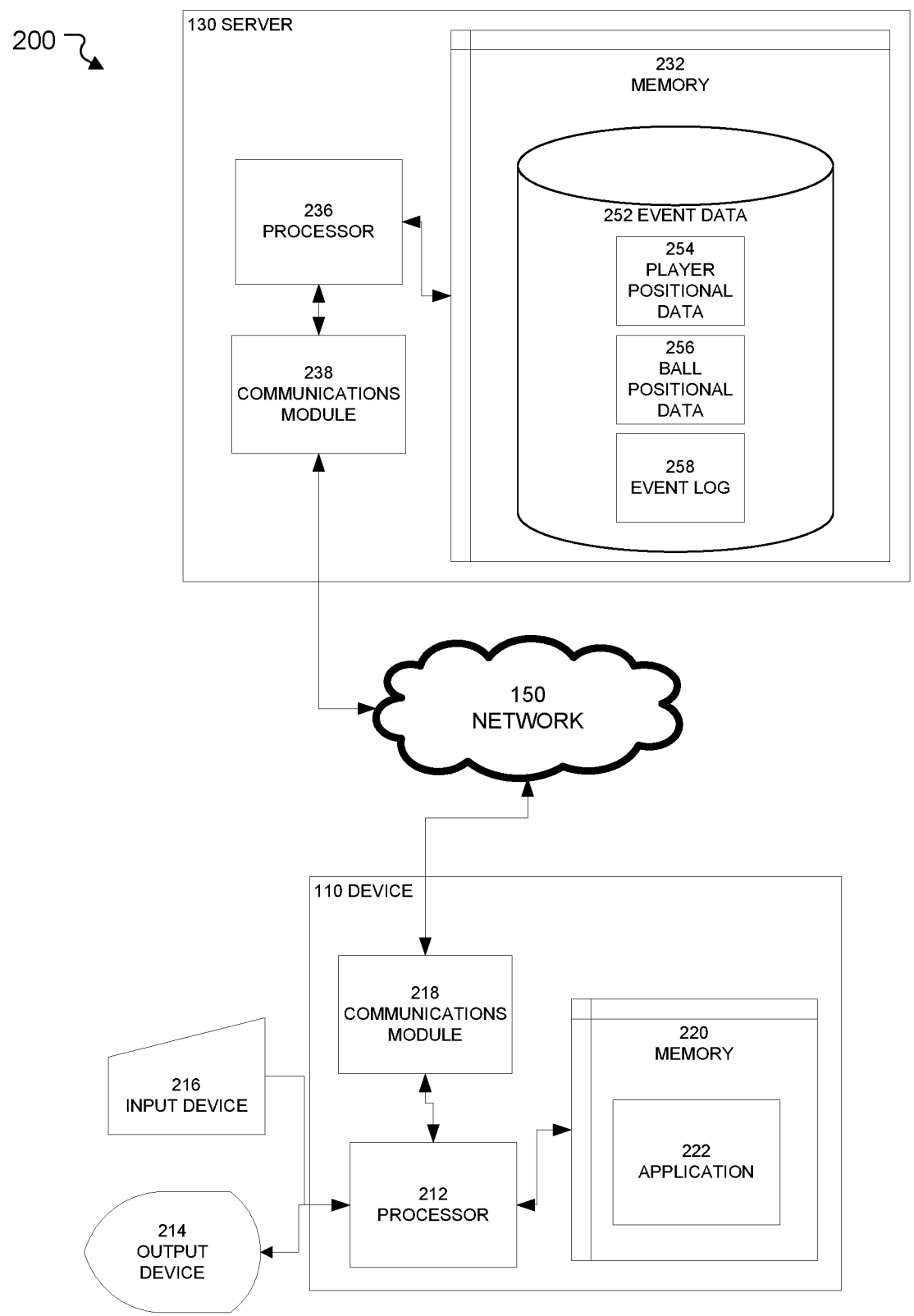
FIG. 2 is a block diagram illustrating the example device and server from the architecture of FIG. 1 according to certain aspects of the disclosure.

FIG. 2 is a block diagram 200 illustrating an example server 130 and device 110 in the architecture 100 of FIG. 1 according to certain aspects of the disclosure.

The device 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232 that includes event data 252. The processor 236 of the server 130 is configured to execute instructions, such as instructions physically coded into the processor 236, instructions received software in memory 240, or a combination of both. For example, the processor 236 of the server 130 executes instructions to send at least a portion of the event data 252.

The event data 252 corresponds to real-world data collected during a live sporting event, such as a football game. Although the present disclosure describes the sporting event as a football game, in other implementations the sporting event may be another sport, such as baseball, basketball, hockey, etc., or any other live event having one or more persons acting according to a set of rules in a finite space and using specialized equipment. The event data 252 includes player positional data 254, ball positional data 256, and event log 258.

The player positional data 254 includes an identification of the player, an orientation of the player on the physical field, a position of the player with respect to the physical field, and a time the player positional data was captured. The location may describe a two-dimensional location on a plane defined by the physical field. Alternatively, the location may describe a three-dimensional location, for example by including a height above the field. The player positional data 254 may include other data which describes the relationship of the player with respect to the physical field at the time.

The player positional data 254 may be collected through sensors placed on each player, and/or throughout the football field. For example, radio frequency identification (RFID) chips may be placed in each player's gear. The RFID chips are each individually identifiable, so as to identify each player. Each player may be equipped with more than one RFID chip to determine additional data. For example, a player's orientation can be determined by having a chip in each shoulder pad. The player's orientation may be determined based on the positions of the left shoulder and the right shoulder relative to each other, such that which direction or who the player is facing can be determined. Additional RFID chips may be placed elsewhere, such as near the player's arms, hands, legs, head, etc., to further determine the position and/or orientation of the player's body. The RFID chips may be read by one or more RFID antennas near the field. In other implementations, cameras or other sensors on or near the field may capture the players' locations and movements to record the player positional data 254.

The player positional data 254 may include multiple sampling points, such that the player positional data 254 includes the orientations and positions of the player throughout the sporting event. For example, the player positional data 254 may have been sampled at a periodic time interval, such as every second throughout the sporting event.

The player positional data 254 may include player positional data for additional players, such as for all players who have been active at some point during the game. The identifiers for each player in the game may include, for example, player name, player number, player team, as well as a unique identifier.

The ball positional data 256 includes a location of the physical ball with respect to the physical field, and a time the ball positional data was captured. For example, the football itself may be equipped with one or more RFID chips, which is detected and recorded for the ball positional data 256. The ball positional data 256 may include other data which describes the relationship of the ball with respect to the physical field, such as an orientation of the ball. The ball positional data 256 may include multiple sampling points, such that the ball positional data 256 includes the locations of the ball throughout the sporting event. The ball positional data 256 may have been sampled at a periodic time interval, which may be the same or different as the periodic time interval associated with the player positional data 254.

The event log 258 describes events that occurred during the sporting event, which may be relevant to the simulation and not otherwise captured by the player positional data 254 and the ball positional data 256. For example, the event log 258 may include descriptions and timestamps of huddles, huddle breaks, snaps, handoffs, penalties, and game calls during the sporting event. Game calls may include calls made by referees, challenge flags thrown and subsequent rulings, timeouts called, injuries, and other game delays or stoppages of play. The event log 258 may further include positional data of other game elements, such as referees themselves, pylons and other markers, goalposts, and first down markers.

The event data 252 may include raw data, such as raw sensor data. Alternatively, the event data 252 may be preformatted, in other words in a format readily usable by the application 222. In other implementations, the application 222 may convert at least portions of the event data 252 to be used by the application 222.

The device 110 includes a processor 212, the communications module 218, and the memory 220 that includes the application 222. The application 222 may be a simulation engine, or software capable of simulating a sporting event, such as a sports video game. The device 110 also includes an input device 216, such as a keyboard, mouse, touchscreen and/or game controller, and an output device 214, such as a display. The processor 212 of the device 110 is configured to execute instructions, such as instructions physically coded into the processor 212, instructions received from software in memory 220, or a combination of both. The processor 212 of the device 110 executes instructions from the application 222 causing the processor 212 to receive player positional data, which may be collected from RFID tags, optical sensors or cameras tracking players, global positioning system (GPS) devices on players, near field communications (NFC) devices on players, wireless devices or trackers on players, or other ways of tracking player positions on a field. Executing the instructions also causes the processor 212 to receive ball positional data, which may be collected similar to player positional data. Executing the instructions also causes the processor 212 to position a simulated player on a simulated field based on the player positional data, such as by spawning or repositioning the simulated player on the simulated field in a location indicated by the player positional data with respect to the field. Executing the instructions also causes the processor 212 to position a simulated ball on the simulated field based on the ball positional data, such as by spawning or repositioning the simulated ball on the simulated field in a location indicated by the ball positional data with respect to the field. Executing the instructions also causes the processor 212 to run a simulation, for example by starting a replay mode or beginning a play in a gameplay mode of the video game. Executing the instructions also causes the processor 212 to receive user input, for example by receiving input control signals from a wired or wireless video game controller or other input device. Executing the instructions also causes the processor 212 to modify the simulation based on the user input, such as by reading the user input, interpreting the user input based on the game mode or context, and effectuating the corresponding actions in the simulation.

Executing the instructions for receiving the player positional data may also cause the processor 212 to receive a plurality of orientations of the player, a plurality of positions of the player, and a plurality of times the player positional data was captured at first periodic time intervals during the sporting event. For example, the player positional data may have been sampled and collected periodically or continuously throughout the real-world game. Executing the instructions for receiving the ball positional data may also cause the processor 212 to receive a plurality of locations of the physical ball, and a plurality of times the ball positional data was captured at second periodic time intervals during the sporting event. For example, the ball positional data may have been sampled and collected periodically or continuously throughout the real-world game, either at a same or different periodic time interval as the player positional data.

Executing the instructions for running the simulation may also cause the processor 212 to recreate the sporting event with the simulated player and the simulated ball based on the player positional data and the ball positional data. For example, the simulation may follow the plurality of locations of the player and the physical ball and the corresponding plurality of times by adhering to the locations and times relative to the physical field.

Executing the instructions also causes the processor 212 to receive an event log of the sporting event. The event log includes descriptions and timestamps of huddles, huddle breaks, snaps, handoffs, penalties, and game calls during the sporting event. The event log may include game description details, game commentary, such as audio commentary, challenges to game calls, booth review of game calls, timeouts, and other game events such that the real-world game may be faithfully recreated in the simulation. The event log may be generated by game observers, imported from other game data sources, or automatically generated, such as by the processor 212 processing live game footage to identify stoppages of game play and the corresponding cause of stoppage. Executing the instructions for running the simulation may also cause the processor 212 to recreate the sporting event based on the event log, for example by recreating the huddles, huddle breaks, snaps, handoffs, penalties, game calls, and other game events according to the corresponding timestamps.

The received user input may correspond to pausing the simulation, replaying the simulation, speeding up the simulation, slowing down the simulation, and/or adjusting a view of the simulation. For example, in the replay mode, the user inputs may correspond to replay controls such as pause, play, speed up, slow down or rewind, and camera controls.

The received user input may correspond to controlling a movement or action of the simulated player, and executing the instructions for running the simulation may also cause the processor 212 to modify the simulation by deviating the simulated player from the player positional data based on the received user input. For example, in the game mode, the user inputs may correspond to game controls, such as moving (the player), acceleration burst, hurdle or hurry up, stiff arm, spin or spiking the ball, celebrating, juking, lob passing, bullet passing, touch passing, high passing, low passing, scrambling, catching, aggressive catching, possession catching, getting skinny, ball hawking, playing receiver, secondary adjustments, defensive line adjustments, linebacker adjustments, chasing (the quarterback), conservative tackling, aggressive tackling, assisted strafing, strip ball tackling, pass rushing, etc. The processor 212 will modify the simulation by effectuating the user input, which may cause the simulated player to deviate from the player positional data.

Deviating the simulated player from the player positional data may occur when the received user input moves the simulated player outside of a ghost ring (e.g., visual ring) centered at the position of the player of the player positional data. For example, small player movement inputs may not cause deviation as the simulated player does not move outside the ghost ring, bur larger player movement inputs which moved the simulated player outside the ghost ring may cause deviation. The deviation may cause a second player to be within a deviation ring, which may be centered around the deviated simulated player, which causes the second player to also deviate. For example, the user may move the simulated player into another player, which would respond accordingly rather than following a corresponding second player positional data. The second player positional data may not appropriately reflect how the second player in the real-world game would react to the deviated player. A radius of the ghost ring is different from a radius of the deviation ring. For example, the ghost ring may be larger or smaller than the deviation ring.

Executing the instructions also causes the processor 212 to analyze the player positional data to determine behavioral analysis of the player. The behavioral analysis corresponds to common patterns, reactions, and tendencies of the player. For example, routes that the player runs in certain situations, common reactions and reaction speeds to various situations, and other player tendencies may be determined by analyzing the player positional data. Executing the instructions also causes the processor 212 to update statistics associated with the simulated player based on the behavioral analysis. The statistics includes numeric data corresponding to speed and ability of the player. For example, based on the player positional data and behavioral analysis, the player's actual speed and abilities may be numerically determined for game conditions, such as type of field, weather conditions, playing time, and other game conditions. The updating may occur based on current game conditions in the simulation, such as if the weather changed in the simulation or the player played a certain number of minutes, the player's statistics may dynamically update accordingly.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
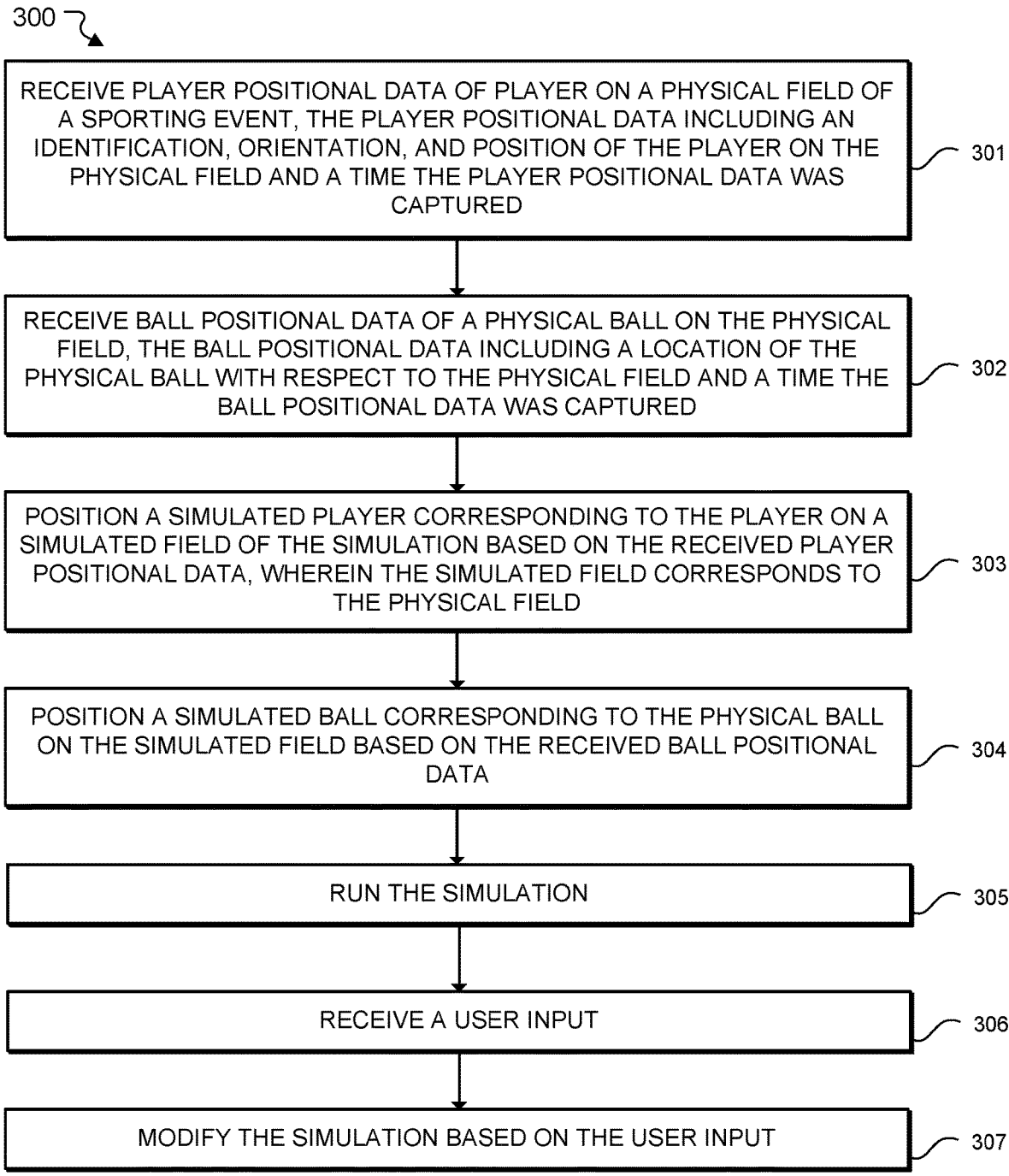
FIG. 3 illustrates an example process for improved simulation of a sporting event using the example device/server of FIG. 2.

FIG. 3 illustrates an example process 300 for improving simulation of a sporting event by using real-world data to seed the simulation, using the example device 110 of FIG. 2. While FIG. 3 is described with reference to FIG. 2, it should be noted that the process steps of FIG. 3 may be performed by other systems. In addition, the process 300 is not limited to the specific order of steps presented in FIG. 3.

The process 300 begins by proceeding to step 301 when, for example, the device 110 receives the player positional data 254 from the server 130. The player positional data 254 corresponds to a player on a physical field of a sporting event to be simulated. The process 300 continues step 302 when, for example, the device 110 receives the ball positional data 256 from the server 130. In certain aspects, the device 110 may receive additional data from the server 130. For example, the device 110 may receive the event log 258.

The received event data 252 in steps 301 and 302 may be received in any order, and may be received more than once. For example, in certain implementations, the event data may be received continuously throughout the corresponding football game. Alternatively, the received event data 252 may correspond to a portion of the football game, such as a specific play, a specific drive, a specific quarter or half, etc. In addition, portions of the event data 252 may be selected by the user. For example, the user may select event data corresponding to a specific game or team. The user may sort available event data 252, for example by game date or by team name.

Once portions of the event data 252 are received, the process 300 continues to step 303 when, for example, the device 110 positions a simulated player corresponding to the player on a simulated field of the simulation based on the received player positional data 254. For instance, the application 222 may establish the simulated field, which corresponds to the physical field. FIGS. 4A-6 show, for example, a user player 420 on a field 410 in the application 222.

The process 300 continues to step 304 when, for example, the device 110 positions a simulated ball corresponding to the physical ball on the simulated field based on the received ball positional data 256. For instance, and as will be described in detail further below, in FIGS. 4A-6, a ball 430 is shown on the field 410. The steps 303 and 304 may be performed in any order. In addition, additional game elements, such as team players 422 and opposing players 424 may be positioned on the field 410 based on corresponding player positional data 254. The positioning of the ball and the players may occur, for example, while the application 222 loads the field 410 and other game elements.

The process 300 continues to step 305 when, for example, the device 110 runs the simulation by running the application 222. At step 306, the device 110 receives a user input. At step 307, the device 110 modifies the simulation based on the user input, as will be described below. The steps 306 and 307 may repeat and continue for each user input.

The event data 252 may be used by the application 222 for one of several game modes. For example, in a replay mode the event data 252 may be used to recreate an entire football game within the application 222. Rather than having to digitize the entire football game (e.g. through additional processing and hardware) to have an accurate simulation, or reconfiguring the game engine of the application 222 (e.g. by determining sufficient customized parameters and/or handicapping to produce the desired outcome), following the event data 252 may produce a reasonably accurate simulation.

Depending on the granularity of data available, the game engine may simulate actions between the sample points to produce a reasonable recreation. For example, the event data 252 may indicate that the ball was moved from the quarterback at a specific time, to another location where a receiver moved to. Based on the speed the ball moved, the game engine may determine that the ball was thrown. Similarly, based on the ball's speed after reaching the receiver, the game engine may determine that the ball was caught and carried for a gain. Although the exact motions of the players' bodies may not fully match the real-world game, the game engine may produce body movement and animation which is consistent with the recorded ball movement, such that the real-world game is reasonably recreated in the simulation. For example, the game engine may treat the player positional data 254 for all players as user input for controlling players, and based on the situation and surroundings for each player, the game engine may apply animations for each player.

The game engine may further determine the situation and surroundings based on the player positional data 254, the ball positional data 256, the event log 258, and other data known to the game engine, such as each player's football position (e.g. quarterback, lineman, etc.), down, field position, score, etc. For instance, for a given play, if the play clock has not started, the players are located along the line of scrimmage, the ball is located at a specific player identified as the center position, and the ball moves from the center to the quarterback when the play clock starts, the game engine may recognize this ball movement as a snap, and accordingly apply a ball snapping animation to the center. If the ball movement is quick and the ball travels five to seven yards behind the line of scrimmage to the quarterback, for example in a "shotgun" formation, the game engine may apply a thrown snap animation to the center. If the ball movement was slow and the ball moved to the quarterback close behind the center, the game engine may apply a handoff snap animation to the center.

In another example, the player positional data 254 may indicate two opposing players in close proximity and facing each other based on their respective orientations. The player positional data 254 may also indicate that these two players have not moved a lot, for example less than a yard. Rather than applying a slow walking animation to these players, the game engine may recognize that one player is blocking the other player, and accordingly apply a blocking animation. The applied animation may further be selected to remain consistent with all available data.

The event data 252 may further allow users to take over at any point during the simulation, and play out the game. In other words, the user may play game scenarios which have been set up according to the real-world game, at which point the simulation ends or deviates from the real-world game. The user may then compare his performance against the real-world results, for example to produce a more favorable result. This further allows the user to play iconic plays or moments, recreate and improve on historical plays, produce different outcomes for desired games or plays, or test the user's ability to recreate the same play.

The event data 252 may also be analyzed for use within the application 222. For example, players' habits or tendencies may be determined, such as routes they tend to run, reactions in certain scenarios and/or responses to the ball in certain situations, and other common patterns, reactions, and tendencies. The event data 252 may also be analyzed to update game statistics ("stats") of players, such as speed and ability stats.

Figure 4A:
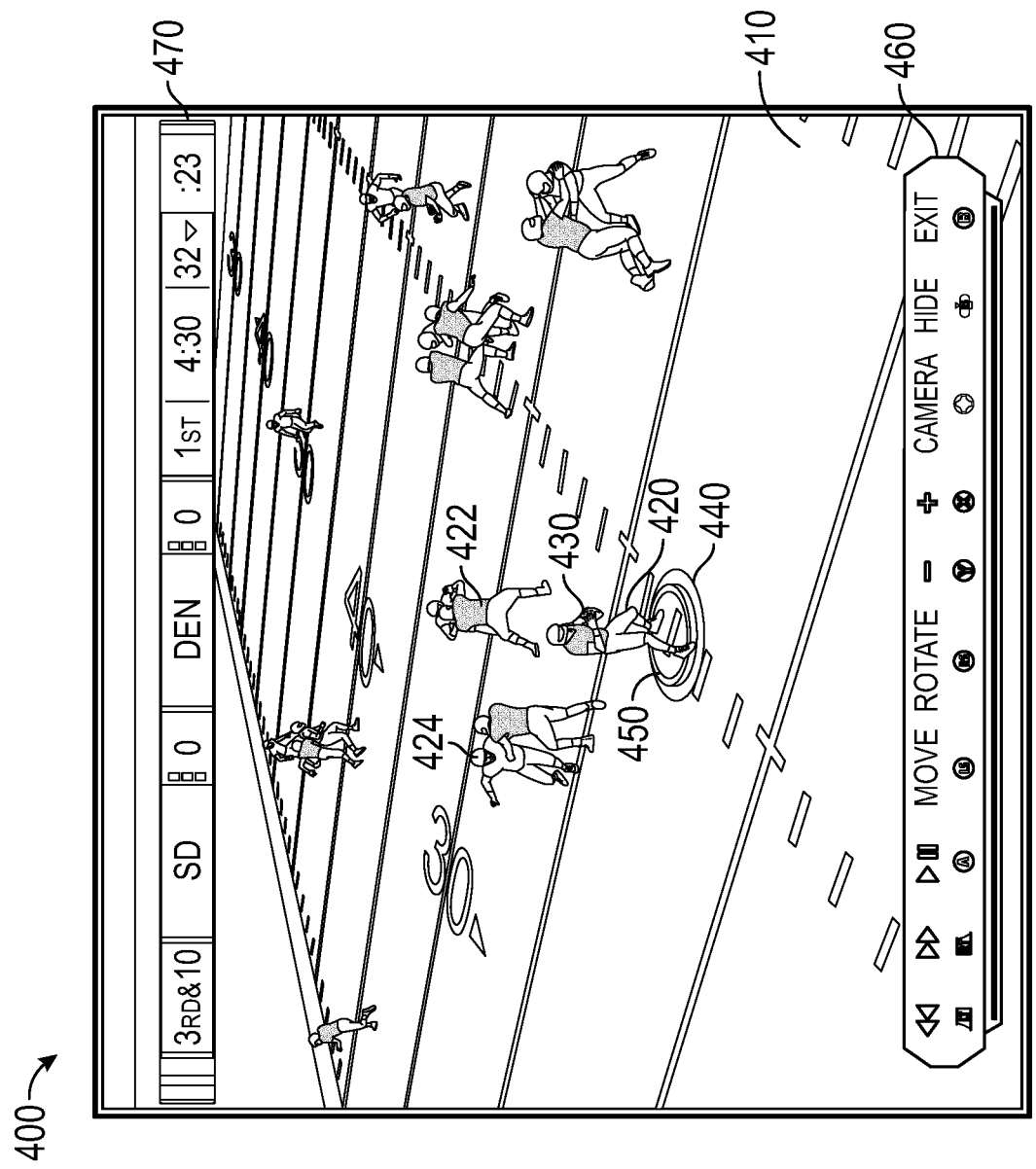
FIGS. 4A-6 are example illustrations associated with the example process of FIG. 3.

FIG. 4A shows a screenshot 400 of the field 410, which may be the replay mode. The user player 420 has the ball 430. Team players 422 (players on the same team as the user player 420), and opposing player 424 (players on the opposite team as the user player 420) are also displayed. A scoreboard 470 displays game information, including, for example, the scores for each team, game clock, timeouts left, down and yardage, quarter, etc. A control menu 460 shows what input controls are mapped to which functions. For example, the control menu 460 shows controls for pause/play/replay, speeding up, slowing down, rewinding, moving a virtual camera, rotating the camera, zooming in/out, adjusting to different cameras, hiding the control menu 460, and exiting the current game mode. Based on the user input, the simulation may run and be accordingly modified. The replay mode allows the user to watch a simulation of a real-world game, with the added features of virtual cameras not available in the real-world.

FIG. 4A further shows a ghost ring 450 and a deviation ring 440. The ghost ring 450 may be centered at the ball 430, or the player having possession of the ball 430, e.g. the user player 420 in FIG. 4A. In game modes where the user inputs directly control the user player 420 (or another selected player such as one of the team players 422 when on offense or one of the opposing players 424 when on defense), the ghost ring 450 represents a circle within which the selected player is considered to be following the corresponding player positional data 254. In other words, if the user player 420 is moved outside of the ghost ring 450, the current play has deviated from the corresponding real-world play. The ghost ring 450 may move based on the player positional data 254 or the ball positional data 256. The ghost ring 450 may have a radius of, for example, two feet in the field 410.

The deviation ring 440 represents a circle around the selected player within which other players, such as the team players 422 or the opposing players 424, will deviate from their respective player positional data 254. For example, the selected player, e.g. the user player 420, may move close enough to another player such that the other player would react to the selected player rather than behave only according to the player positional data 254. In other words, if the user player 420 deviates from the real-world play, the deviation ring 440 presents a mechanism for other players to deviate and react accordingly. The deviation ring 440 may have a similar or different radius from the ghost ring 450, such as a larger radius of five feet, twenty feet, etc. In certain implementations, once the user deviates from the ghost ring 450, the play continues without any event data 252.

Figure 4B:
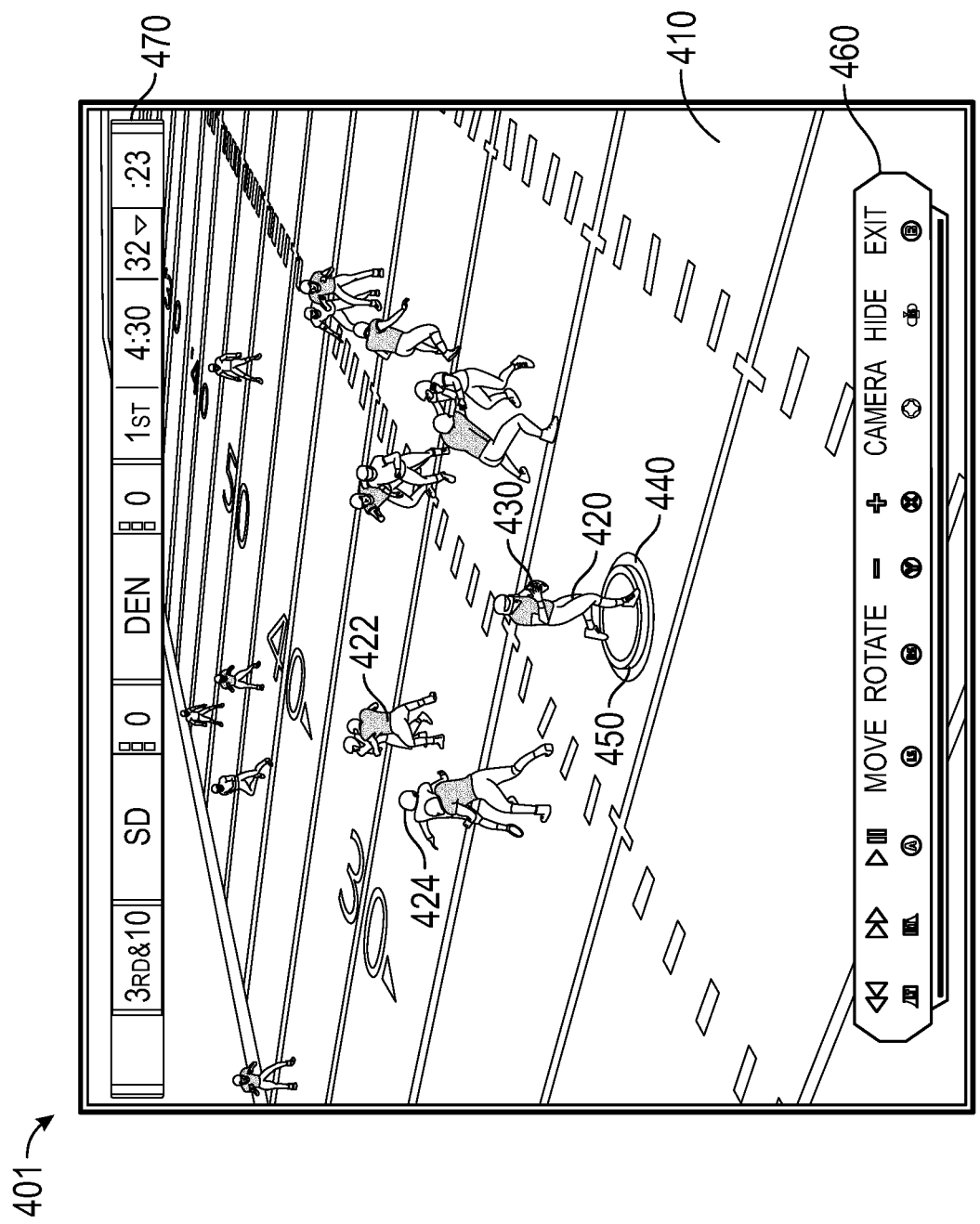

FIG. 4B shows a screenshot 401. In FIG. 4B, the user player 420, along with the ball 430, ghost ring 450, and deviation ring 440, have moved according to the player positional data 254 corresponding to the user player 420.

Figure 4C:
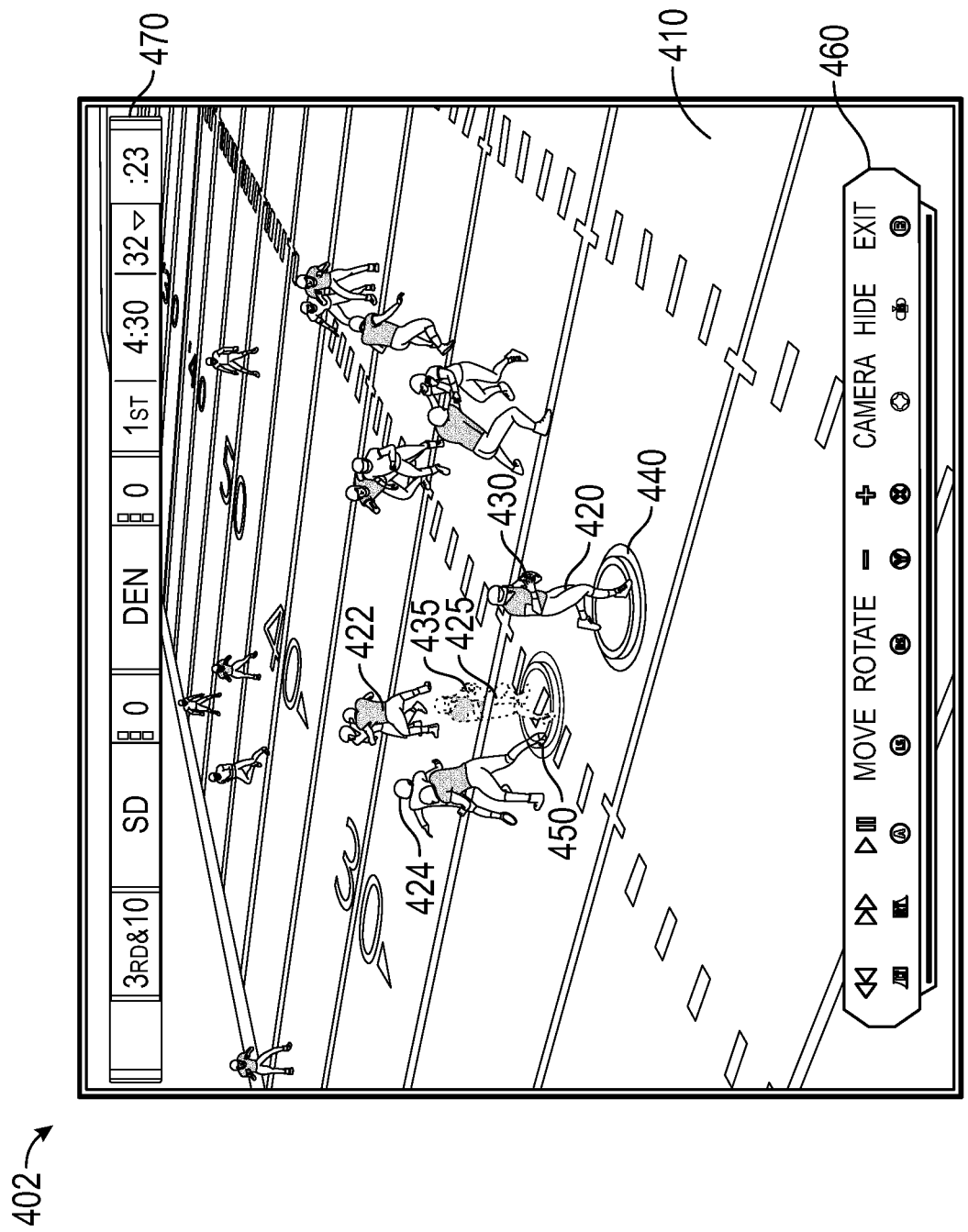

FIG. 4C shows a screenshot 402. In FIG. 4C, the user has deviated from the ghost ring 450. FIG. 4C shows a ghost player 425 and a ghost ball 435, which are semi-transparent or otherwise highlighted renderings representing the positions of the player and the ball according to the corresponding player positional data 254 and the ball positional data 256. The deviation ring 440 may remain with the user player 420. In this view, the user is able to see how he has deviated from the real-world play. In certain implementations, the ghost player 425 may be displayed for every deviated player or only for the selected player. In certain implementations the ghost player 425 and the ghost ball 435 may be optional and not displayed.

Figure 5A:
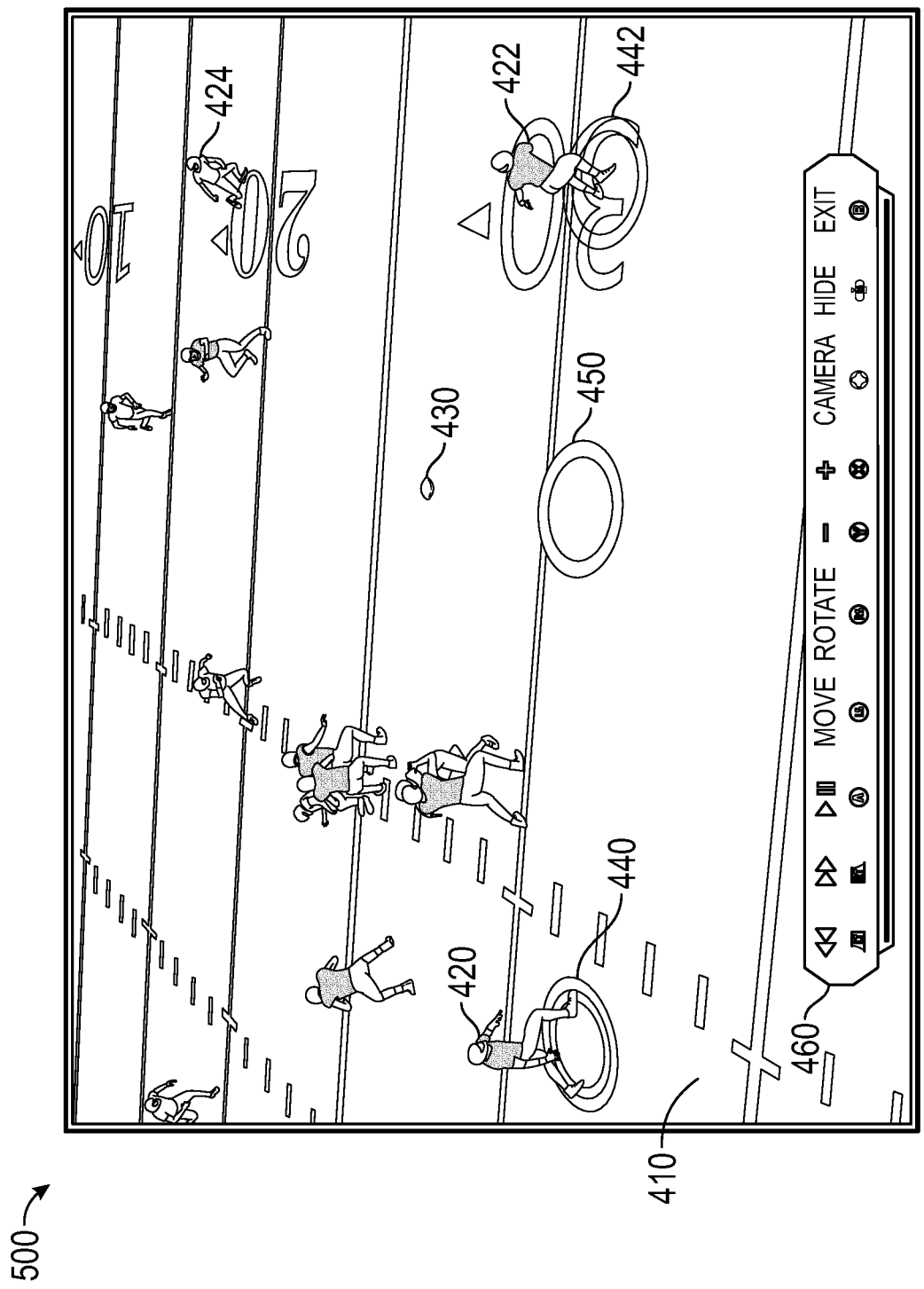
Figure 5B:
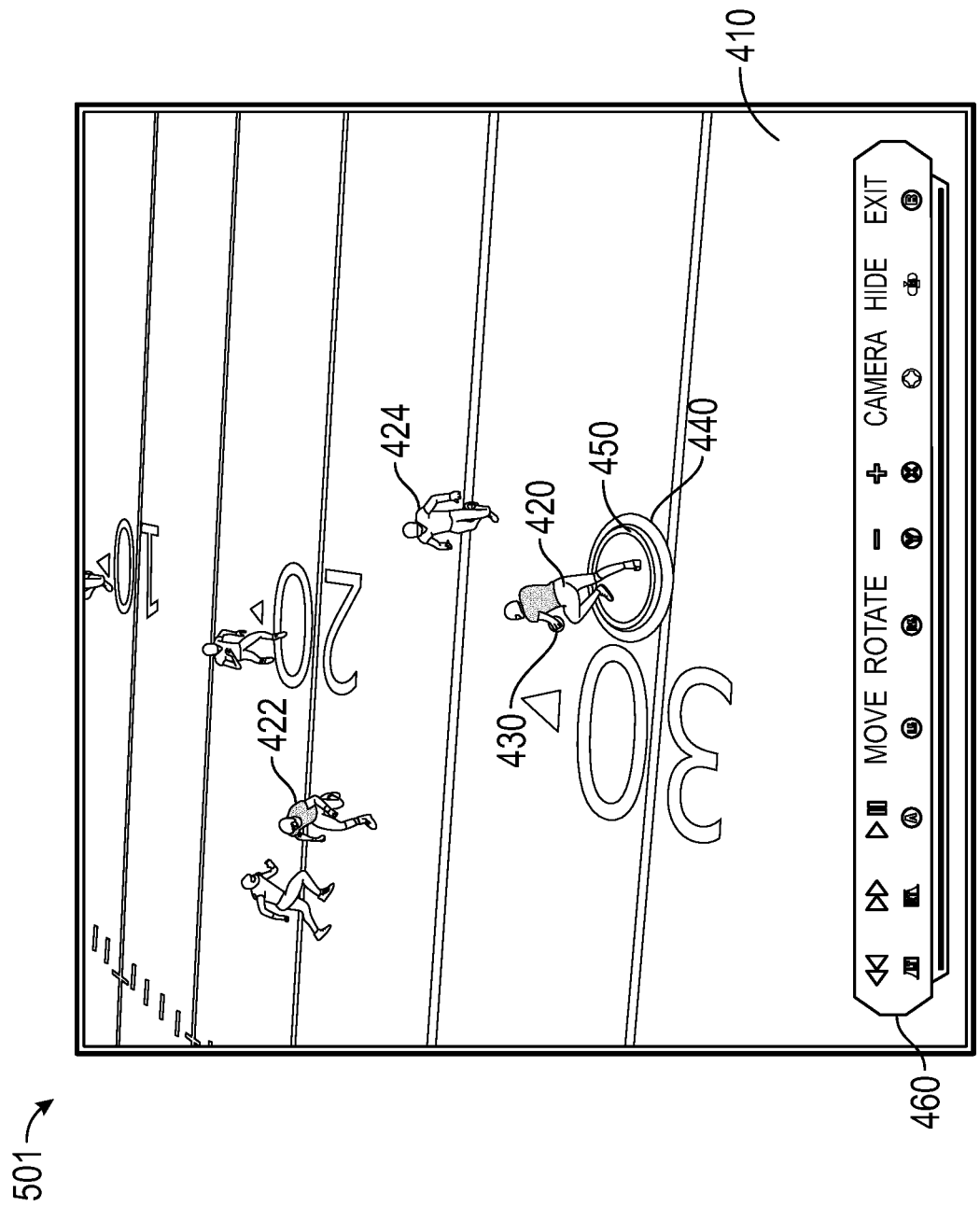

FIG. 5A shows a screenshot 500. The ball 430 is in the air, for example being passed from the user player 420 to a receiver, e.g. team player 422 according to the event data 252. The ghost ring 450 follows the ball 430 until caught by the team player 422. The team player 422 has a corresponding deviation ring 442, as user control may be passed from the user player 420 to the team player 422. FIG. 5B shows, in a screenshot 501, the team player 422 of FIG. 5A has caught the ball 430 and is now, in FIG. 5B, the user player 420. The ghost ring 450 and the deviation ring 440 now follow the current user player 420.

Figure 6:
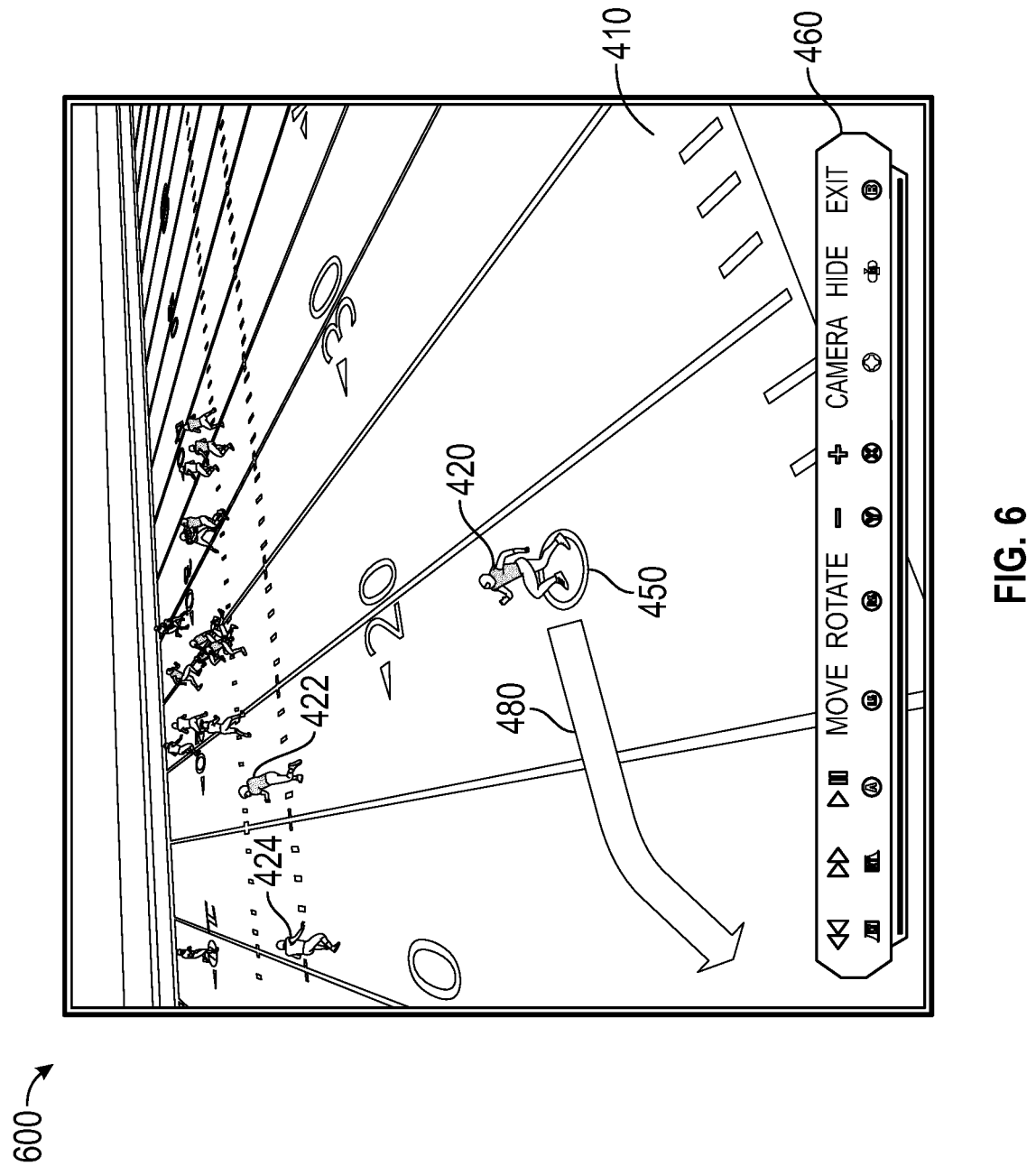

FIG. 6 shows a screenshot 600. In FIG. 6, a route 480 is shown. Based on behavioral analysis of the player positional data 254 for the user player 420 (e.g. the player corresponding to the user player 420), certain patterns, reactions, and tendencies may be determined. The route 480 represents a predicted route the user player 420 will likely run, given the scenario. In certain implementations, the route 480 may not be displayed. By determining the predicted route for all players, such as the user player 420 and team players 422 and opposing players 424, the plays for a given team in a given situation may also be predicted. The predicted plays may further be presented to the user, for example as a selectable play.

Hardware Overview

Figure 7:
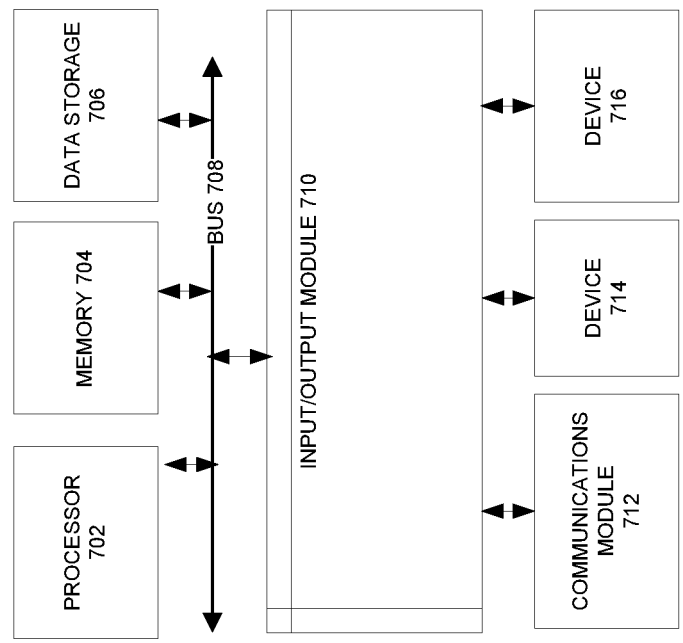
FIG. 7 is a block diagram illustrating an example computer system with which the devices and server of FIG. 2 can be implemented.

FIG. 7 is a block diagram illustrating an example computer system 700 with which the device 110 and server 130 of FIGS. 1 and 2 can be implemented. In certain aspects, the computer system 700 may be implemented using hardware or a combination of software and hardware, either in a dedicated server, or integrated into another entity, or distributed across multiple entities.

Computer system 700 (e.g., device 110 and server 130) includes a bus 708 or other communication mechanism for communicating information, and a processor 702 (e.g., processor 212 and 236) coupled with bus 708 for processing information. According to one aspect, the computer system 700 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques. By way of example, the computer system 700 may be implemented with one or more processors 702. Processor 702 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704 (e.g., memory 232 or 220), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry. Expansion memory may also be provided and connected to computer system 700 through input/output module 710, which may include, for example, a SIMM (Single In Line Memory Module) card interface. Such expansion memory may provide extra storage space for computer system 700, or may also store applications or other information for computer system 700. Specifically, expansion memory may include instructions to carry out or supplement the processes described above, and may include secure information also. Thus, for example, expansion memory may be provided as a security module for computer system 700, and may be programmed with instructions that permit secure use of computer system 700. In addition, secure applications may be provided via the SIMM cards, along with additional information, such as placing identifying information on the SIMM card in a non-hackable manner.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices (e.g., input device 216 and/or output device 214). The input/output module 710 can be any input/output module. Example input/output modules 710 include data ports such as USB ports. In addition, input/output module 710 may be provided in communication with processor 702, so as to enable near area communication of computer system 700 with other devices. The input/output module 710 may provide, for example, for wired communication in some implementations, or for wireless communication in other implementations, and multiple interfaces may also be used. The input/output module 710 is configured to connect to a communications module 712. Example communications modules 712 (e.g., communications modules 238 and/or 218) include networking interface cards, such as Ethernet cards and modems.

The components of the system can be interconnected by any form or medium of digital data communication, e.g., a communication network. The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 712 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 712 sends and receives electrical, electromagnetic or optical signals that carry digital data streams representing various types of information. The network link typically provides data communication through one or more networks to other data devices. For example, the network link of the communications module 712 may provide a connection through local network to a host computer or to data equipment operated by an Internet Service Provider (ISP). The ISP in turn provides data communication services through the world-wide packet data communication network now commonly referred to as the "Internet." The local network and Internet both use electrical, electromagnetic or optical signals that carry digital data streams. The signals through the various networks and the signals on the network link and through communications module 712, which carry the digital data to and from computer system 700, are example forms of transmission media.

Computer system 700 can send messages and receive data, including program code, through the network(s), the network link and communications module 712. In the Internet example, a server might transmit a requested code for an application program through Internet, the ISP, the local network and communications module 712. The received code may be executed by processor 702 as it is received, and/or stored in data storage 706 for later execution.

In certain aspects, the input/output module 710 is configured to connect to a plurality of devices, such as an input device 714 (e.g., input device 216) and/or an output device 716 (e.g., output device 214). Example input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 716 include display devices, such as a LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 716 may include appropriate circuitry for driving the output device 716 to present graphical and other information to a user.

According to one aspect of the present disclosure, the device 110 and server 130 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

Computing system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 702 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 706. Volatile media include dynamic memory, such as memory 704. Transmission media include coaxial cables, copper wire, and fiber optics, including the wires that include bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that include bus 708. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for improving simulation of a sporting event by using real-world data to seed the simulation, the method comprising:
   positioning a simulated player corresponding to a player on a simulated field of the simulation based on player positional data, wherein the simulated field corresponds to a physical field;
   positioning a simulated ball corresponding to a physical ball on the simulated field based on ball positional data;
   modifying the simulation based on user input by deviating the simulated player from the player positional data of the player on the physical field of the sporting event based on the user input when the user input moves the simulated player outside of a visual ring; and
   deviating a second player from a corresponding second player positional data when the second player is within a deviation ring, a radius of the visual ring different from a radius of the deviation ring.

2. The computer-implemented method of claim 1, wherein receiving the player positional data further comprises receiving a plurality of orientations of the player, a plurality of positions of the player, and a plurality of times the player positional data was captured at first periodic time intervals during the sporting event, wherein receiving the ball positional data further comprises receiving a plurality of locations of the physical ball, and a plurality of times the ball positional data was captured at second periodic time intervals during the sporting event.

3. The computer-implemented method of claim 2, wherein running the simulation further comprises recreating the sporting event with the simulated player and the simulated ball based on the player positional data and the ball positional data.

4. The computer-implemented method of claim 3, further comprising:
receiving an event log of the sporting event, the event log comprising descriptions and timestamps of huddles, huddle breaks, snaps, handoffs, penalties, and game calls during the sporting event,
wherein running the simulation further comprises recreating the sporting event based on the event log.

5. The computer-implemented method of claim 4, wherein the user input corresponds to one or more of pausing the simulation, replaying the simulation, speeding up the simulation, slowing down the simulation, and adjusting a view of the simulation.

6. The computer-implemented method of claim 4, wherein the user input corresponds to controlling a movement or action of the simulated player.

7. The computer-implemented method of claim 6, wherein the visual ring is centered at the position of the player from the player positional data.

8. The computer-implemented method of claim 2, further comprising:
analyzing the player positional data to determine behavioral analysis of the player, the behavioral analysis corresponding to common patterns, reactions, and tendencies of the player.

9. The computer-implemented method of claim 8, further comprising:
updating statistics associated with the simulated player based on the behavioral analysis, the statistics comprising numeric data corresponding to speed and ability of the player.

10. The computer-implemented method of claim 1, further comprising:
simulating actions between sample points of the player positional data and the ball positional data to produce body movement for the simulated player.

11. The computer-implemented method of claim 1, further comprising:
animating opposing players in close proximity based on their respective orientations.

12. A system for improving simulation of a sporting event by using real-world data to seed the simulation, the system comprising:
a memory comprising instructions;
a processor configured to execute the instructions to:
position a simulated player corresponding to a player on a simulated field of the simulation based on player positional data, wherein the simulated field corresponds to a physical field;
position a simulated ball corresponding to a physical ball on the simulated field based on ball positional data;
modify the simulation based on user input by deviating the simulated player from the player positional data of the player on the physical field of the sporting event based on the user input when the user input moves the simulated player outside of a visual ring; and
deviate a second player from a corresponding second player positional data when the second player is within a deviation ring, a radius of the visual ring different from a radius of the deviation ring.

13. The system of claim 12, wherein the processor is further configured to execute the instructions to:
receive an event log of the sporting event, the event log comprising descriptions and timestamps of huddles, huddle breaks, snaps, handoffs, penalties, and game calls during the sporting event,
wherein running the simulation further comprises recreating the sporting event based on the event log.

14. The system of claim 13, wherein the user input corresponds to one or more of pausing the simulation, replaying the simulation, speeding up the simulation, slowing down the simulation, and adjusting a view of the simulation.

15. The system of claim 13, wherein the user input corresponds to controlling a movement or action of the simulated player.

16. The system of claim 12, wherein the visual ring is centered at the position of the player from the player positional data.

17. The system of claim 13, wherein the processor is further configured to execute the instructions to:
simulate actions between sample points of the player positional data and the ball positional data to produce body movement for the simulated player.

18. The system of claim 12, wherein the processor is further configured to execute the instructions to:
analyze the player positional data to determine behavioral analysis of the player, the behavioral analysis corresponding to common patterns, reactions, and tendencies of the player.

19. The system of claim 18, wherein the processor is further configured to execute the instructions to:
update statistics associated with the simulated player based on the behavioral analysis, the statistics comprising numeric data corresponding to speed and ability of the player.

20. A non-transitory machine-readable storage medium comprising machine-readable instructions for causing a processor to execute a method for improving simulation of a sporting event by using real-world data to seed the simulation, comprising:
positioning a simulated player corresponding to a player on a simulated field of the simulation based on player positional data, wherein the simulated field corresponds to a physical field;
positioning a simulated ball corresponding to a physical ball on the simulated field based on ball positional data;
modifying the simulation based on user input by deviating the simulated player from the player positional data of the player on the physical field of the sporting event based on the user input when the user input moves the simulated player outside of a visual ring; and
deviating a second player from a corresponding second player positional data when the second player is within a deviation ring, a radius of the visual ring different from a radius of the deviation ring.

* * * * *